No. 749,159. PATENTED JAN. 12, 1904.
C. L. A. BRASSEUR.
STEREOSCOPIC COLOR IMAGE AND PROCESS OF MAKING SAME.
APPLICATION FILED MAY 14, 1902.
NO MODEL.
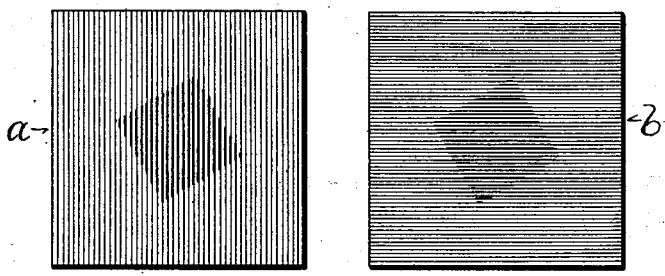

No. 749,159. Patented January 12, 1904.

UNITED STATES PATENT OFFICE.

CHARLES L. A. BRASSEUR, OF NEW YORK, N. Y.

STEREOSCOPIC COLOR IMAGE AND PROCESS OF MAKING SAME.

SPECIFICATION forming part of Letters Patent No. 749,159, dated January 12, 1904.

Application filed May 14, 1902. Serial No. 107,244. (No specimens.)

*To all whom it may concern:*

Be it known that I, CHARLES L. A. BRASSEUR, a citizen of the United States, and a resident of New York city, in the county of New York and State of New York, have invented a certain new and useful Improvement in Stereoscopic Color Images and Processes of Making Same, of which the following is a specification.

The present invention relates to stereoscopic color photography in which "patterned" party-colored screens are employed to furnish colors and in which the photographs used to regulate the amounts of said colors are taken behind screens of like patterns. Such screens and the methods of using them in connection with single photographs are described in the French patent of Ducos-DuHauron of 1868, (No. 83,061.) Such patterned screens are difficult to make, and, so far as I am aware, those that have been made have always been formed of linear strips of colors lying edge against edge and running from two hundred to over five hundred lines to the inch. The stringy or fibrous appearance of the color-photographs made behind and viewed through such line-screens is objectionable, especially when enlarged by stereolenses, as it detracts from the perfection of the illusion.

The object of this invention is to break up or avoid the stringy or patterned appearance, to produce a more natural appearance of the colored image or photograph, and to obtain the perfection of binocular vision.

To these ends the invention consists in taking one subdivided stereoscopic image through a patterned party-colored screen of one arrangement or design and the other subdivided stereoscopic image through a patterned party-colored screen with its pattern differently arranged or designed. Thus where screens ruled in lines of different colors are used for both images the lines on one screen are arranged differently from those on the other, as by having one set of lines arranged vertically and the other set arranged to make a right or other angle with the first set of lines. It will be understood, of course, that such screens are not one behind the other, or the different arrangement or design may consist in having the pattern on one party-colored screen partly or wholly unlike that on the other party-colored screen. The images are viewed through screens corresponding in pattern with those through which the negatives are taken.

It would be no departure from my invention if the same screens are employed in both taking and viewing the images; but in that case a correcting-screen is necessary in order to obtain correct colors in the final image.

The invention also includes subdivided stereoscopic images in which the patterned areas of one are differently arranged from those in the other. The result attained is that the patterned appearance practically disappears when the two images are viewed in the stereoscope.

The invention is illustrated in the accompanying drawing, forming part of this specification, in which the reference *a* designates one subdivided image and its screen and reference *b* the other such image and screen, linear screens being shown for convenience merely.

It is not essential to my invention that the pattern of one of the screens be the same as that of the other or even the same in kind. Thus I may take one of the subdivided stereoscopic images (negative) behind a screen of one arrangement, design, or pattern and the other such image behind a screen patterned differently, the patterns of the two screens being in this case differently arranged within the scope of my invention and claims.

What I claim as new, and desire to secure by Letters Patent of the United States, is—

1. That improvement in the art of color photography, substantially as hereinbefore described, which consists in taking subdivided stereoscopic negatives of the object through patterned party-colored screens whose patterns are differently arranged.

2. That improvement in the art of color photography, substantially as hereinbefore described, which consists in taking subdivided steroscopic negatives of the object through party-colored line-screens, the lines of one screen being at an angle to the lines of the other screen.

3. A pair of subdivided stereoscopic images, the patterned areas of one such image being arranged differently from the patterned areas of the other image, substantially as described.

4. A pair of linearly-subdivided stereoscopic images, the linear areas of one image being at an angle to the linear areas of the other image, substantially as described.

Signed at New York city, in the county of New York and State of New York, this 13th day of May, A. D. 1902.

CHARLES L. A. BRASSEUR.

Witnesses:
FRANK RYALL,
HERMAN LEWIS.